(12) United States Patent
Quetel et al.

(10) Patent No.: US 8,257,073 B2
(45) Date of Patent: Sep. 4, 2012

(54) OVEN FOR THE THERMAL CONDITIONING OF PREFORMS, COMPRISING A VENTILATION PLENUM

(75) Inventors: François Quetel, Octeville sur Mer (FR); Jérôme Demare, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 158 days.

(21) Appl. No.: 12/627,987

(22) Filed: Nov. 30, 2009

(65) Prior Publication Data

US 2010/0136160 A1 Jun. 3, 2010

(30) Foreign Application Priority Data

Dec. 1, 2008 (FR) .................................... 0858163

(51) Int. Cl.
*B29C 49/68* (2006.01)
(52) U.S. Cl. .................. 425/73; 425/210; 425/526
(58) Field of Classification Search .............. 425/73, 425/210, 174.4, 526
See application file for complete search history.

(56) References Cited

U.S. PATENT DOCUMENTS

| | | | | |
|---|---|---|---|---|
| 3,342,211 | A * | 9/1967 | Johnson | 137/601.09 |
| 4,880,581 | A * | 11/1989 | Dastoli et al. | 264/39 |
| 5,322,651 | A | 6/1994 | Emmer | |
| 5,714,109 | A | 2/1998 | Diller | |
| 7,121,821 | B2 * | 10/2006 | Pickel | 425/174.4 |
| 2007/0085243 | A1 * | 4/2007 | Doudement | 264/521 |
| 2010/0015269 | A1 * | 1/2010 | Matsushita et al. | 425/143 |
| 2011/0203579 | A1 * | 8/2011 | Quetel et al. | 126/85 R |

FOREIGN PATENT DOCUMENTS

| | | |
|---|---|---|
| EP | 0 564 354 A1 | 10/1993 |
| WO | WO 2005/068161 A1 | 7/2005 |
| WO | WO 2008/105253 A1 | 9/2008 |

OTHER PUBLICATIONS

French Search Report dated Jun. 29, 2009.

* cited by examiner

*Primary Examiner* — Robert B Davis
(74) *Attorney, Agent, or Firm* — Young & Thompson

(57) ABSTRACT

An oven (10) for the thermal conditioning of preforms made of thermoplastic, is traversed upstream to downstream by an air stream (A) for cooling the preforms and includes successively an air inlet zone (16a) having at least one air inlet port (22a), a zone (16b) for heating the preforms, that includes at least one ventilation module (36) that is able to guide the air stream (A) coming from the inlet zone (16a) to the preforms, an air extraction zone (16c) having at least one air extraction duct (68), characterized in that the air inlet zone (16a) includes a plurality of ventilation modules (36) and at least one air distribution chamber (18), called a plenum (18), which is interposed between the air inlet port (22a) and each of the ventilation modules (36).

15 Claims, 4 Drawing Sheets

OVEN FOR THE THERMAL CONDITIONING OF PREFORMS, COMPRISING A VENTILATION PLENUM

The invention relates to an oven for the thermal conditioning of preforms of containers made of thermoplastic that comprises a ventilation plenum.

The invention relates more particularly to an oven for the thermal conditioning of preforms of containers made of thermoplastic, the oven being traversed upstream to downstream to by an air stream for cooling the preforms and that comprises successively, in the direction of flow of said air stream:

- an air inlet zone that comprises at least one air admission port through which said air stream flows from the outside of the oven to the inside of the oven,
- a zone for heating the preforms, that comprises means for heating the preforms and at least one ventilation module that is able to guide the air stream coming from the inlet zone to the preforms,
- an air extraction zone comprising at least one air extraction duct, the air extraction zone being traversed by the air stream that flows from the heating zone to the outside of the oven.

The production of containers, such as flasks, bottles etc, made of thermoplastic, for example PET (polyethylene terephthalate), is generally carried out from preforms obtained by injection moulding.

Such preforms are previously conditioned thermally in an oven so to enable them to be converted, notably by blow moulding or by stretch-blow moulding, into a container.

Preforms are generally in the form of a specimen mainly comprising a body of varying length and a neck that already has its final shape. In point of fact the neck of the preform forms the neck of the container and has for example a thread designed to receive a screw stopper.

Before carrying out the blowing operation, it is necessary to heat the body of the preforms to a temperature above their glass transition temperature without however damaging or "burning" the outer surface or skin of the body of the preforms.

To this end, it is known to subject the preforms, when they are in the heating zone, to a stream of cooling air circulating in this zone. This has the effect of encouraging heating by radiation and by moderating the effects of heat conduction through the mass of air contained in the oven.

A heating oven is known, for example from document EP-A1-1 699 613, for the thermal conditioning of preforms which is traversed by a stream of air for cooling the preforms.

Such an oven mainly and successively comprises, from upstream to downstream in the direction of flow of said air stream, is an air inlet zone, a zone for heating the preforms, and a downstream air extraction zone.

The zones are for example built into the interior of the oven and are disposed so that extraction in the extraction zone is carried out in the top or upper part of the oven, the heating zone being interposed between the inlet zone and the extraction zone.

The heating zone is equipped with means for heating the preforms, for example by infrared radiation lamps.

The heating means are aligned in the oven so as to extend along all or part of the path of the preforms in the oven.

One of the preoccupations of a person skilled in the art is the control of the thermal conditioning of preforms on which the quality of the final container directly depends and with which cooling or heating efficiency is closely linked.

The oven comprises a plurality of ventilation modules that are arranged in the heating zone of the oven and that are aligned facing the heating means so as to stir the air in the vicinity of the preforms.

The ventilation modules have the function of moderating the effects of heat conduction through the mass of air contained in the oven and of fully utilizing the infrared of the heating means, so as best to heat the thickness of the walls of the body preforms without burning their skin. This makes it possible to prevent any deterioration of the skin of the preforms but also to maintain the environment of the heating zone below temperatures likely to affect the mechanical components contained therein, such as for example the caps of infrared radiation lamps.

Each ventilation module is connected to a tubular air inlet duct with a circular cross section that extends in the inlet zone of to the oven and that emerges outside the oven.

In addition, each ventilation module has a centrifuge rotor mounted so as to rotate, which draws in air through the inlet duct and which blows air drawn in this way to the preforms so that the cooling air stream flows out in the vicinity of the preforms in order to stir hot air within the heating zone of the oven.

Each centrifuge rotor is arranged in the casing that guides the cooling air stream towards the preforms.

By virtue of the circulation of the cooling air stream, infrared radiation is exploited to the full, which makes it possible to bring the body of the preforms to the desired temperature, uniformly over the thickness of the wall of the body, without damaging the skin of the body of the preforms or furthermore without softening again the neck of the preforms Generally, the oven includes protective means that are able to protect the necks of the preforms from infrared radiation, as well as means dedicated to cooling the necks, which consist for example of part of the cooling air stream and/or of supplementary cooling means, notably by water circulation.

In a complementary manner, the air extraction zone of the oven includes extraction means that are associated with the extraction duct, such as an air extraction hood.

The hood lies vertically above the heating zone and is designed to extract air to the outside coming from the heating zone of the oven, notably to evacuate calories from the oven.

Such extraction means also make it possible to recover and evacuate residual toxic vapours of the sterilizing agent when a decontaminating operation is carried out inside the preforms simultaneously to thermal conditioning.

Such a decontaminating operation is advantageously obtained by depositing a sterilizing agent—such as hydrogen peroxide ($H_2O_2$)—designed to be heat-activated in the oven by the heating means and then evacuated in the vapour state by the air extraction means.

Another preoccupation of a person skilled in the art relates in a general manner to the hygiene and cleanliness of the containers and thus the cleanliness of preforms designed to be converted into containers after heating by blow moulding (or stretch-blow moulding), the containers being then preferably filled is directly in an aseptic medium after they are produced.

As previously indicated, it is known to sterilize the inside of preforms by means of an agent, such as hydrogen peroxide, which evaporates when it is subjected to the heating means of the oven, and is then drawn out by the hood.

In a complementary manner, it is known to decontaminate the outside of the preform, notably the neck, by ultraviolet radiation rays.

Finally, it is known to fit the free end of each inlet duct with an inlet port in which means for filtering air are arranged, so that the ventilation modules deliver filtered air having a given degree of cleanliness to the preforms.

However, the quality of the ventilated air depends on the efficiency of the filters.

Now, the more efficient the filters, the more they oppose the passage of air and in this way create a large pressure loss in the ventilation circuit.

A pressure loss is prejudicial for the satisfactory functioning of the oven since it results in a reduction in the air stream blown towards the preforms by the ventilation modules and thus in a reduction in the cooling performance of the air in the vicinity of the preforms.

The object of the invention is notably to improve still further the cleanliness of the preforms, and therefore of the containers, without however harming either the thermal conditioning of the preforms carried out in the oven or the flow of air ventilated over the preforms by the ventilation modules.

To this end, the invention notably provides means for promoting the filtration quality of the filtration means, while limiting pressure losses in the air inlet or cooling circuit.

The invention more particularly provides an oven of the type previously described, characterized in that the air inlet zone comprises:
  at least two air ventilation modules, and
  at least one air distribution chamber, called a plenum, which is interposed between the air inlet port and each of the ventilation modules, each ventilation module being connected to the distribution chamber.

By means of the air distribution chamber, the ratio is increased between the filtration air quality and the pressure loss.

In point of fact, such a distribution chamber delimits a large common volume of filtered air wherein each ventilation module draws in filtered air, by means of which pressure losses are reduced.

In addition, such a distribution chamber, by virtue of its volume and its compactness, makes it possible to limit restrictions in the cooling circuit, which oppose the cooling air stream and encourage pressure losses.

According to other features of the invention:
  each ventilation module includes a rotor that is mounted rotatingly so as to draw in air continuously into the distribution chamber and to blow the air drawn in in this way to the preforms;
  the distribution chamber is in the form of a parallelepiped casing comprising at least:
    a first large open lateral face that includes a first air inlet port,
    a second large open lateral face that is opposite and parallel to the first large face and that includes a second air inlet port;
  each air inlet port has associated air filtration means;
  each of the filtration means comprises successively at least:
    one upstream pre-filter that is able to filter to particles with a first given diameter, and
    one downstream filter that is able to filter particles with a diameter less than said first given diameter;
  each upstream pre-filter is a gravimetric filter;
  each inlet port has a shape flared out towards the outside of the oven, each downstream pre-filter being arranged in the largest section of the associated air inlet port, upstream of the associated downstream filter, so that the cross section of the passage of each upstream pre-filter is greater than the cross section of the passage of the associated downstream filter;
  the distribution chamber has a large face that extends orthogonally to said large lateral faces, and on which an air manifold is connected that selectively connects each ventilation module to the distribution chamber;
  the inlet zone has means for detecting fouling of said filtration means, said detection means being able to measure:
    a first pressure difference between a point situated directly upstream of the pre-filter and a point situated directly downstream of the pre-filter of the first inlet port, and
    a second pressure difference between a point situated directly upstream of the filter and a point situated directly downstream of the filter of the first inlet port,
    and of comparing each pressure difference with a respective predetermined pressure value, by virtue of which it is possible to evaluate individually the respective degrees of fouling of the pre-filter and of the filter.

Other features and advantages of the invention, as well as details of its design and creation will become apparent on reading the following detailed description, for the understanding of which reference will be made to the appended drawings in which.

In the description and claims, the terms "front" or "rear" will be conventionally adopted in a non-limiting manner with reference to the longitudinal direction, "upper" and "lower" with reference to the vertical direction and according to terrestrial gravity, and the longitudinal, vertical and transverse directions with reference to the axes (L, V, T) indicated in the figures.

The expressions "upstream" and "downstream" will also be used with reference to the direction of circulation of the cooling air stream inside the oven, that is to say from the inlet zone, called upstream, to the extraction zone, called downstream, of the oven.

Figure 1:
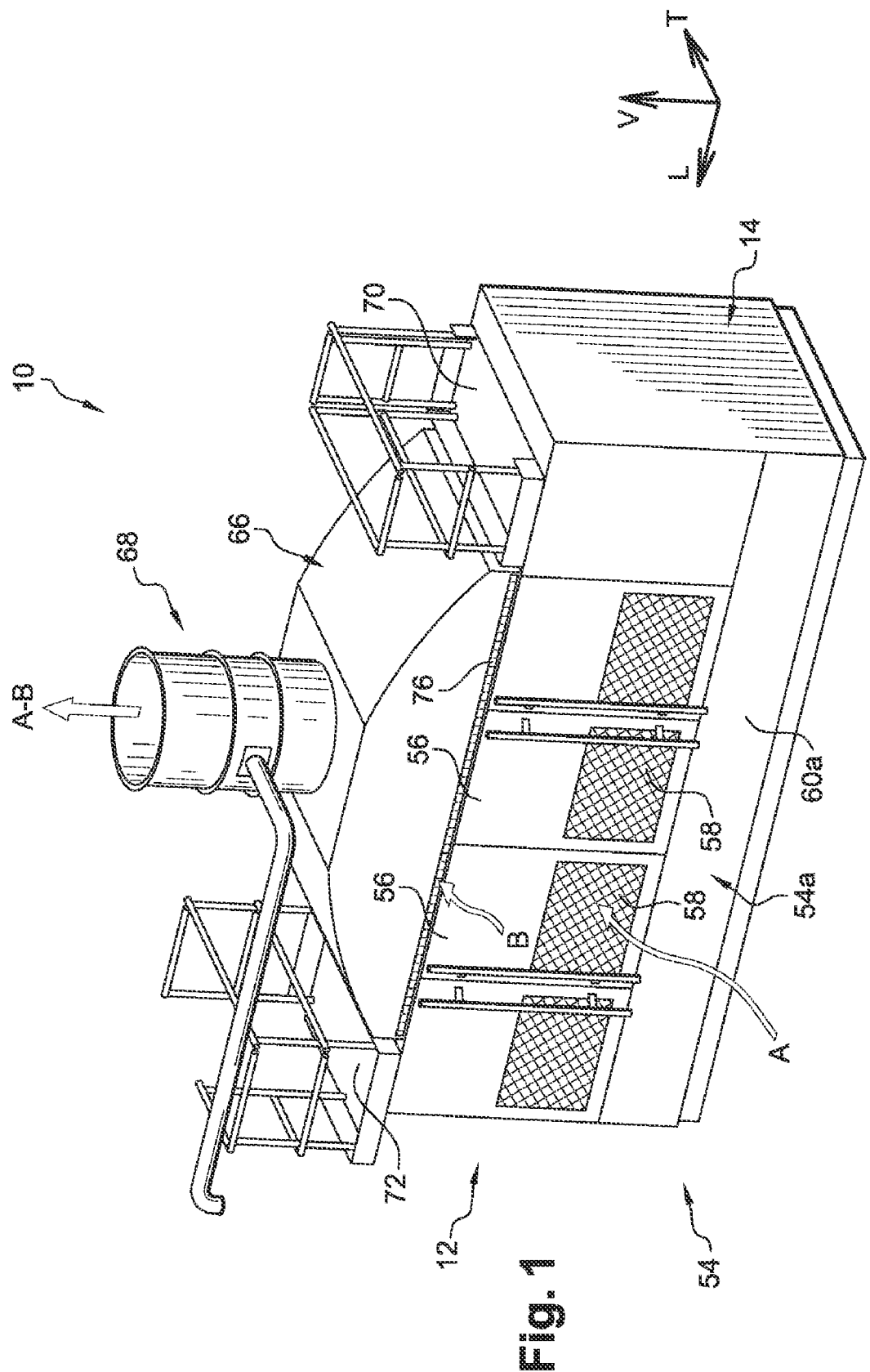
FIG. 1 is an overall perspective view, that illustrates an example of an embodiment of an oven according to the invention, comprising successively an air inlet zone, a zone for heating the preforms and an air extraction zone.

An oven 10 is represented in FIG. 1 for the thermal conditioning of preforms (not shown) made of thermoplastic, for example of PET (polyethylene terephthalate).

The oven 10 has here for example a heating path for preforms in the shape of a U, having two parallel heating sections, one going forward and the other returning, connected to together by a transverse curvilinear section called a stabilization section.

The oven 10 has overall the form of a tunnel that extends longitudinally from rear to front, from a first rear side 12, to a second closed opposite front side 14.

The rear side 12 is open so as to enable the preforms to pass. However, it is open in a zone under excess pressure as will be subsequently described, so that contaminated particles cannot enter the oven through this rear side 12.

Figure 2:
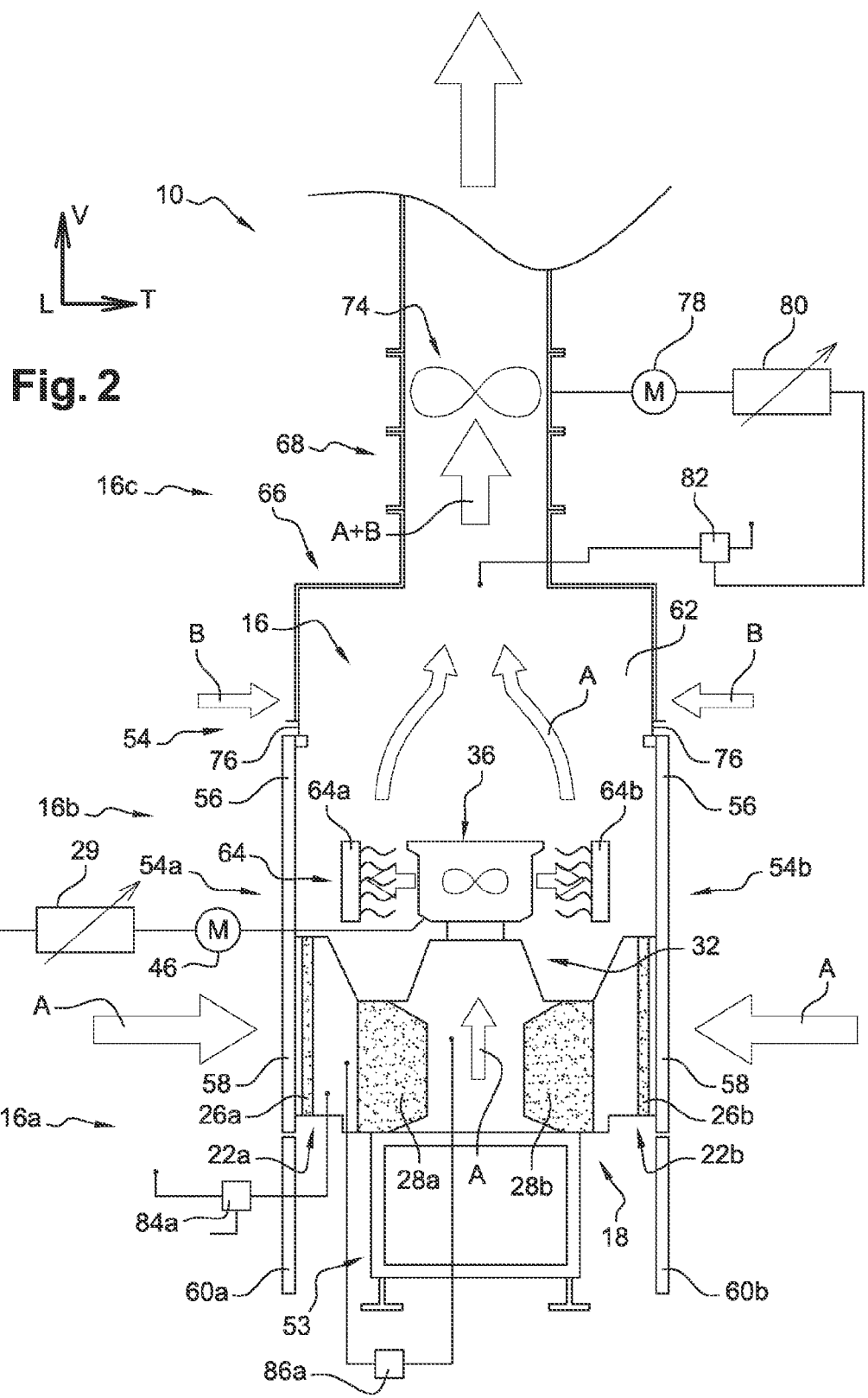
FIG. 2 is a schematic view in cross section that illustrates the flow, from upstream to downstream, of a stream of cooling air through the zones of the oven of FIG. 1 and a chamber for distributing the cooling air stream connected to a plurality of ventilation modules.

As may be seen in FIG. 2, the oven 10 has a general design symmetry relative to a middle vertical plane (not shown) extending longitudinally while passing through the middle of the oven 10, and identical elements are designated by the same indexed references.

The oven 10 is only one of the stations of an installation for producing containers, for example bottles, from preforms.

Such a production installation includes for example a preform feed device (not shown) that feeds the oven 10 with preforms through the rear side 12 of the oven 10.

The preforms are introduced inside the oven 10 by transfer means in the region of the rear side 12 where the preforms are loaded by the conveyor means of the oven 10, an operation that is also called "loading".

The preforms are then carried along in the oven 10 by conveyor means (not shown) for example here following a heating path in the shape of a U.

Finally, the preforms leave the oven 10 through the rear side 12 and are, after having been thermally conditioned by the oven 10, loaded by other transfer means (not shown) so as to lead them directly to a moulding device (not shown) with a view to converting them by blow moulding or by stretch-blow moulding into a container.

Advantageously, the means for conveying the preforms are capable of transporting the preforms following the heating path and have supporting elements (not shown) also sometimes called "turntables", each of which cooperates with the inner wall of the neck of each preform.

Preferably, the supporting elements of the conveying means are capable of carrying each preform in rotation on itself so as to encourage suitable heat distribution in the body of each preform.

According to FIG. 2, the oven 10 is traversed by an air stream A for cooling the preforms, which flows upstream to downstream, through the oven 10, more precisely here vertically upwards.

As may be seen in FIGS. 1 and 2, the oven 10 essentially comprises a cooling circuit 16, comprising successively, according to the direction of flow of the air stream A, an air inlet zone 16a, also called the upstream zone, a zone 16b for heating the preforms and an air extraction zone 16c, also called the downstream zone.

The three zones 16a, 16b, 16c are here superimposed vertically and the air stream flow A occurs successively through each zone upwards, following a heat gradient from the coldest to the hottest zone.

Advantageously, such an arrangement of the zones of the cooling circuit makes it possible to obtain an oven having good compactness and enables the convection principle to be exploited.

The air inlet zone 16a has at least one distribution chamber 18, called a plenum, which is here in the form of a parallelepiped casing through which the cooling air stream A flows from outside the oven 10 to the inside of the oven 10.

Figure 4:
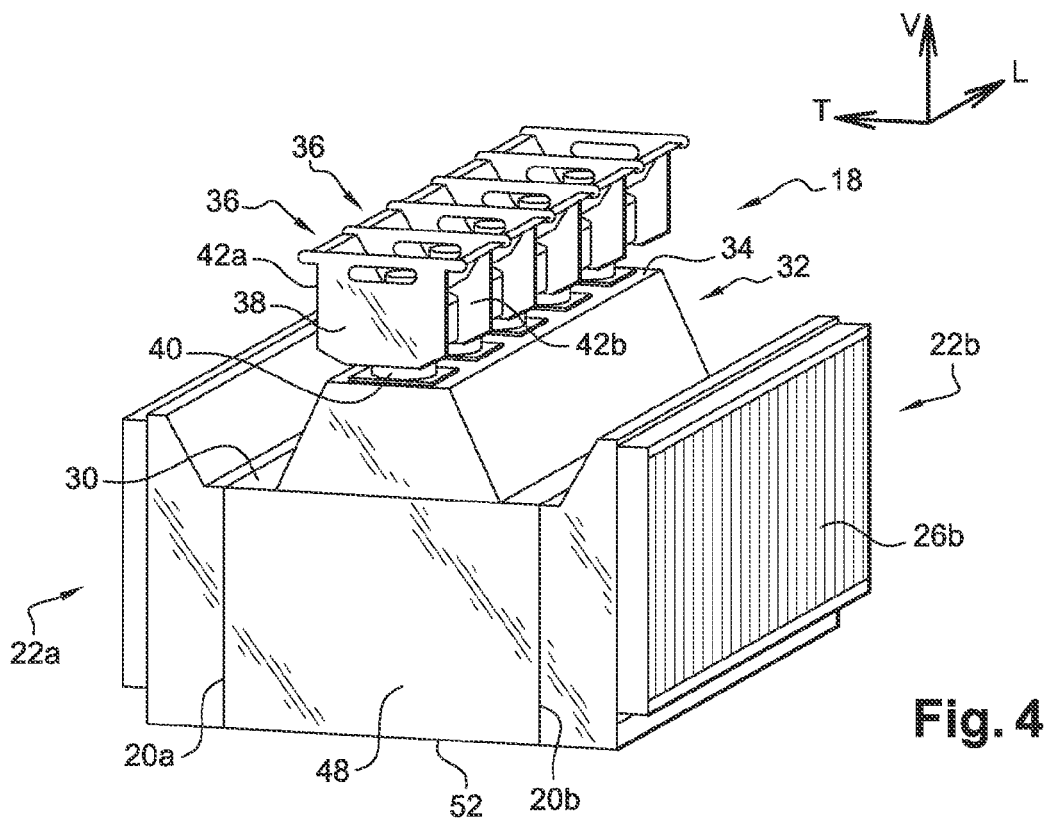
FIG. 4 is a detailed perspective view that illustrates the distribution chamber equipped with two inlet ports and a manifold to which the ventilation modules of the oven of FIG. 1 are connected.

To this end, as may be seen in FIG. 4, the plenum 18 has a first large longitudinal vertical face 20a that is fitted with a first air inlet port 22a.

The inlet port 22a extends transversely from the plenum 18 and has a flared shape with a cross section increasing towards the outside of the oven 10.

Figure 5:
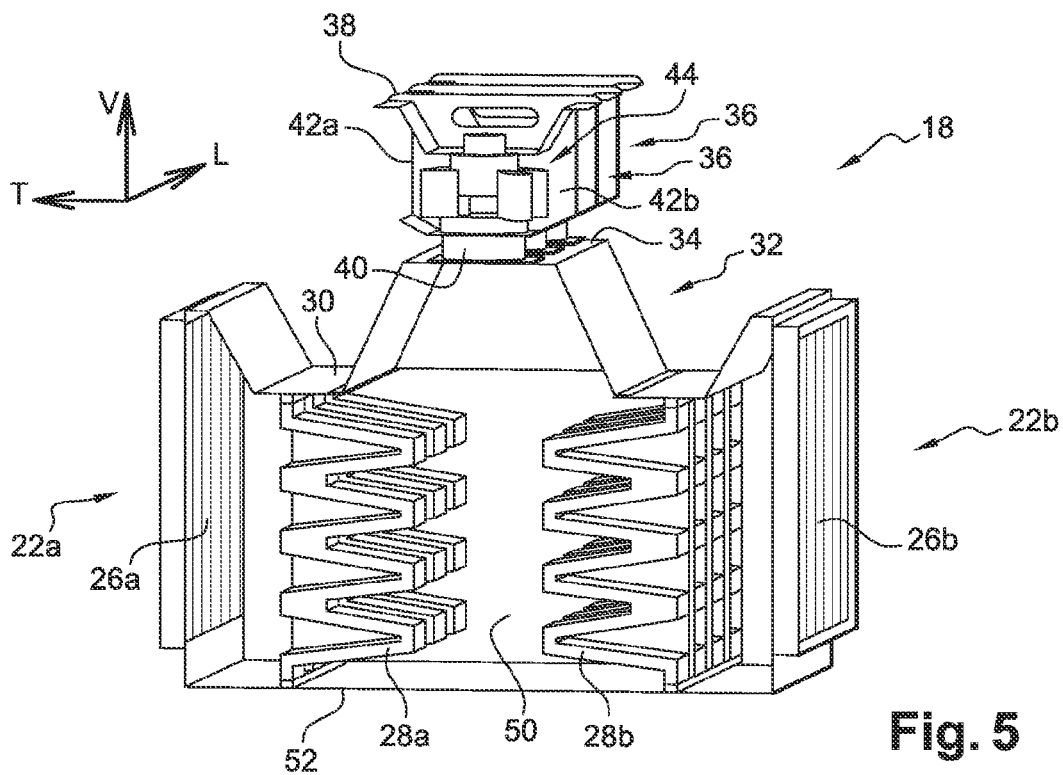
FIG. 5 is a detailed view in section and in perspective, which illustrates the filtration means arranged inside the distribution chamber and a centrifuge rotor arranged in a ventilation module of the oven of FIG. 1.

According to FIGS. 2 and 5, the inlet port 22a has first filtration means 26a, 28a, the pre-filter 26a of which is arranged in the vicinity of a port upstream of the inlet port 22a and a filter 28a that is arranged in the vicinity of port downstream of the inlet port 22a.

According to FIG. 5, the pre-filter 26a is arranged in the widest section of the associated inlet port 22a, upstream of the filter 28a, so that the cross section of the passage of the pre-filter 26a is greater than the cross section of the passage of the filter 28a.

Preferably, the pre-filter 26a is a gravimetric filter that is able to filter particles called large particles, which have a given diameter, for example greater than ten microns.

Similarly, the filter 28a is a filter of the type called "opacimetric", that is able to filter particles called fine particles with a given diameter, for example greater than one micron.

With a symmetry in relation to the general plane of symmetry, the plenum 18 has a second large longitudinal vertical face 20b that is arranged facing the first large face 20a that is fitted with a second air inlet port 22b.

Similarly, the inlet port 22b has a second means of filtration 26b, 28b, with a pre-filter 26b and a filter 28b.

Thus, each air inlet port 22a, 22b is fitted with means for filtering the air drawn in, so that only filtered air with a given degree of cleanliness is drawn in and introduced into the inlet zone 16a of the oven 10.

The plenum 18 has third large upper horizontal face 30, on which an air manifold 32 is connected that extends longitudinally over all the length of the plenum 18.

The manifold 32 has a trapezoidal cross section decreasing upwards, and is delimited towards the top by an upper distribution to face 34.

In addition, the plenum 18 is delimited longitudinally by a first vertical transverse plate 48 and by a second vertical transverse plate 50 opposite the first vertical transverse plate 48.

Finally, the plenum 18 is delimited vertically towards the bottom by a transverse longitudinal bottom plate 52.

Figure 3:
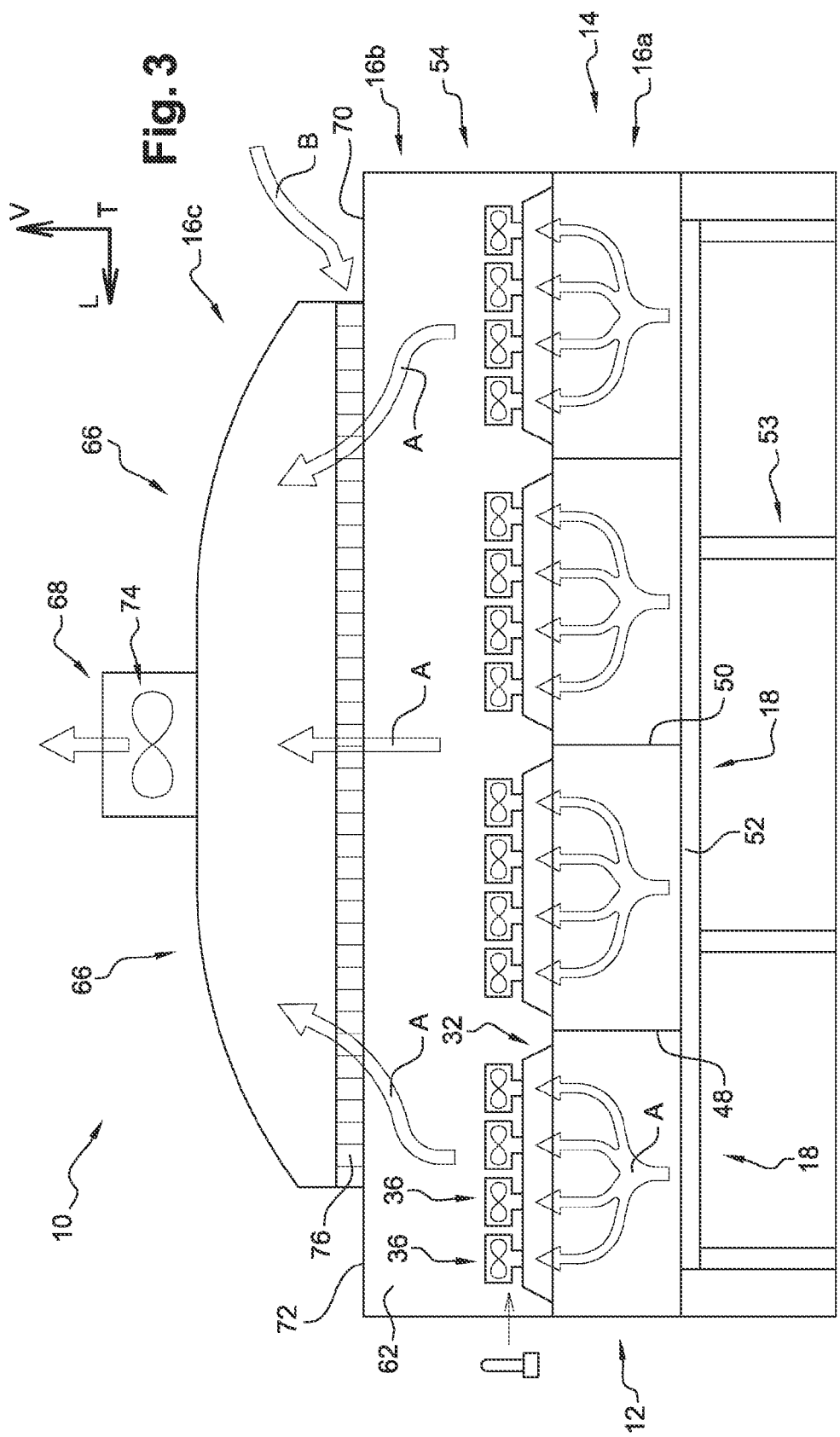
FIG. 3 is a schematic view in longitudinal section, that illustrates the arrangement of a plurality of distribution chambers within the oven inlet zone of FIG. 1.

According to FIGS. 2 and 3, the oven 10 has a frame 53 that supports the plenum 18 in a position raised from the ground and that rests on the bottom plate 52 of the plenum 18.

The assembly consisting of the plenum 18, the two inlet ports 22a, 22b and the manifold 32, delimits a large volume of filtered air and large air inlets, by virtue of which pressure losses in the cooling circuit 16 are limited.

The heating zone 16b of the oven 10 has ventilation modules 36, such as centrifugal cooling fans that are aligned along a longitudinal axis above the manifold 32 of the plenum 18.

Each ventilation module 36 has a casing 38 delimiting a lower vertical inlet collar 40 that is connected to the upper distribution face 34 of the manifold 32.

In addition, each casing 38 delimits a first ventilation orifice 42a and a second ventilation orifice 42b.

Finally, each ventilation module 36 has a centrifuge rotor or extraction rotor 44, for example a rotor with vanes, that is mounted so as to rotate about a vertical axis in the associated casing 38, and that can be driven in rotation, for example by an associated actuator such as an electric motor 46 shown schematically in FIG. 2.

Rotation of the rotor 44 creates a reduced pressure upstream of the rotor 44, for drawing in outside air through the plenum 18, and creates an excess pressure downstream of the rotor 44.

Thus, the air stream A flows from the plenum 18, after having been filtered by the filtration means 26a, 28a, 26b, 28b, and then flows through the inlet collar 40 of each ventilation to module 36.

Finally, the air stream A is blown into the heating zone 16b, through the first ventilation orifice 42a and the second ventilation orifice 42b of each ventilation module 36, so as to stir the air in the vicinity of the preforms.

According to the embodiment illustrated in FIGS. 3 to 5, the plenum 18 comprises four ventilation modules 36. It will of course be understood that this number could be different.

In addition, according to FIG. 3, the oven 10 has a series of plenums 18, here four in number, that are adhered together and aligned in the direction of their length in a longitudinal direction, each plenum 18 having a series of four associated ventilation modules 36.

As may be seen in FIGS. 1 to 3, the heating zone 16b is delimited transversely by a peripheral chamber 54.

The peripheral chamber 54 has a least one part, called the lower part, having a first vertical lateral wall 54a and a second vertical lateral wall 54b that are transversely arranged facing each other and each of which extends longitudinally to delimit transversely between them the heating zone 16b inside the oven 10.

In addition, the heating zone 16b is delimited longitudinally towards the front by the closed front side 14, and towards the rear by the open rear side 12.

Each lateral wall 54a, 54b of the peripheral chamber 54 preferably has a plurality of doors 56, here four in number, which give access to the inside of the oven 10, for example for carrying out inspection or maintenance operations inside the oven 10.

Each door 56 has an aeration mesh 58 to enable the air stream A to flow by aspiration from outside the oven 10 to the plenum 18.

As may be seen in FIG. 2, each aeration mesh 58 is arranged facing an associated inlet port 22a, 22b, so that the to passage for air that flows from outside the oven 10 to the inside of the plenum 18 while passing through the inlet ports 22a, 22b, is not, or is only slightly, impeded by the meshes 58.

Each wall 54a, 54b of the peripheral chamber 54 has a lower plate 60a, 60b respectively cladding the oven 10, which extends vertically, substantially from the bottom of the door 56 to the ground.

According to FIGS. 2 and 3, the heating zone 16b is delimited vertically downwards by an upper face of the assembly consisting of the plenum 18, the associated inlet ports 22a, 22b and the associated manifolds 32.

Finally, the peripheral chamber 54 delimits, downstream, an upper opening 62, which emerges vertically upwards, which enables the air stream A to flow upwards.

The upper opening 62 extends over all the perimeter of the oven 10, longitudinally from the rear side 12 to the front side 14 and transversely between the walls of the peripheral chamber 54.

According to FIG. 2, the heating zone 16b has lateral zones 64 for heating the preforms, for example infrared radiation lamps which, when activated, irradiate the bodies of the preforms and bring them to a temperature capable of enabling them to be subsequently converted into containers.

The infrared radiation lamps are for example superimposed in a rack (not shown) forming a heating module, each of the heating modules being adhered to those following along the path of progress of the preforms in the oven 10, so as to form a first longitudinal section 64a of lamps and a second longitudinal section 64b of lamps facing it.

As may be seen in FIG. 2, the ventilation modules 36 are interposed transversely between the first longitudinal section 64a of lamps and the second longitudinal section 64b of lamps, so that the preforms pass between the lamps and the ventilation orifices 42a, 42b of the ventilation modules 36.

Air blown by the ventilation modules 36 preferably flows to through openwork reflectors (not shown) that are arranged in the vicinity of the ventilation orifices 42a, 42b of the ventilation modules 36 and that have for example slots with a vertical orientation.

The reflectors are disposed transversely facing the heating is means 64 and are designed to reflect infrared radiation so as to increase the heating efficiency, while enabling cooling air to pass.

Thus, the ventilation modules 36 stir the air that is situated in the vicinity of the heating means 64 and of the preforms, so as notably to prevent the skin of the body of the preforms from burning and to heat the body of the preforms uniformly.

In addition, the ventilation modules 36 create an excess pressure in the heating zone 16b, in the vicinity of the preforms, which prevents any air other than filtered air from coming into contact with the preforms.

The motor 46 that drives the extraction rotor 44 of each ventilation 36 in rotation cooperates with a first control means 29, in order to vary the speed of rotation of the rotors 44 and consequently varies the air flow blown onto the preforms.

Advantageously, the heating zone 16b has thermal protection means (not shown) for the necks of the preforms so as to prevent their deformation by heating.

Finally, according to FIGS. 1 to 3, the air extraction zone 16c of the oven 10 has a hood 66 that extends upwards from the upper opening 62 of the heating zone 16b to an extraction duct 68, in order to isolate the heating zone 16b in relation to the outside of the oven 10, so as to prevent contamination of the inside of the oven 10 with airborne contaminating particles.

The hood 66 has a lower base with a rectangular shape and has a form flared out towards the heating zone 16b, and thus a cross section of the passage that decreases upwards.

The base of the hood 66 has two opposite longitudinal edges, which are rectilinear overall, which are connected to the upper edge of the lateral walls 54a, 54b respectively of the oven 10.

In a complementary manner, the hood 66 has a first upper horizontal plate 70 and a second upper horizontal plate 72 that are respectively adhered to a first and second transverse edge of the base of the hood 66, so as to delimit vertically the heating is zone 16b of the oven 10.

The first plate 70 and the second plate 72 are here each equipped with an inspection trap door (not shown) to give access to the inside of the oven 10 from above the oven 10, for example in order to carry out maintenance tasks.

The extraction duct 68 has associated means of extraction 74, for example a fan, which is capable of creating a reduced pressure upstream of the extraction means 74, in the extraction duct 68.

The term reduced pressure here signifies a pressure less than atmospheric pressure that exists inside the oven 10.

Here, the air stream A flows from the inside of the oven 10 to the outside of the oven 10, in the direction of the arrows shown in FIGS. 2 and 3.

The downstream end of the extraction duct 68 is for example connected to an evacuation circuit (not shown) that guides the air extracted from the oven 10 into a heating circuit of the premises, or outside the premises in which the oven 10 is situated.

Starting from the hypothesis that the oven 10 is not perfectly airtight, and that the means of extraction 68 produce a pressure reduction inside the oven 10, there is a risk of interfering air streams entering the oven 10, notably around the doors 56.

In order to prevent such air streams, of which the quality is uncontrolled, entering the oven 10, the hood 66 delimits secondary or auxiliary air inlet ports 76, which are arranged downstream of the heating zone 16b, so that an air stream B, called a leakage air stream, flows through the air inlet ports 76 under the effect of the pressure reduction produced by the extraction means 34.

Thus, the air of the leakage air stream B flows from the outside of the oven 10 directly to the air extraction duct 68, without passing through the sensitive heating zone 16b.

Such a design encourages air to enter through the air inlet offices 76, rather than through an interfering air inlet that is uncontrolled, without risking the contamination of the preforms or the internal components of the oven 10.

Advantageously, the air extraction flow through the extraction duct 68 is greater than the aspirated filtered air flow ventilated by the ventilation module 36, so as to evacuate all the ventilated cooling air and to guarantee that air entering in an interfering manner inside the oven 10 by reason of the pressure reduction existing upstream of the extraction conduit 68 exclusively enters through the secondary air inlet air ports 76.

According to another feature, the extraction means 74 are driven in rotation by means of a second motor 78 which, according to its speed of rotation, varies the speed of rotation of the extraction means 74 and consequently varies the pressure reduction downstream of the extraction means 74 and the airflow extracted by the extraction means 74 through the extraction duct 68.

To this end, according to FIG. 1, the oven 10 has a second means 80 for controlling the extraction 74, that cooperate with the second motor 78 in order to vary the operating rate.

In addition, the oven 10 has a first means 82 for measuring the pressure reduction within the air extraction zone 16c, upstream of the extraction means 74.

As may be seen in FIG. 2, the means for measuring pressure reduction 82 are here means for measuring pressure difference or for transmitting pressure difference, for example a piezoresistive sensor.

The means 82 for measuring pressure reduction measure the difference in pressure between the outside of the oven 10 and a point situated inside the hood 66, upstream of the extraction means 74 and downstream of the associated air inlet ports 76.

The second control means 80 control the extraction 74 according to the value of the difference between the pressure measured by the measuring means 82 and the given pressure reduction value, so as to regulate the flow of air extracted by the extraction means 74 according to the associated given value.

The given value of the pressure reduction is predetermined so as to create a pressure reduction inside the hood 66, by virtue of which the flow of air extracted through the extraction duct 68 is greater than the flow of air blown over the preforms by the ventilation module 36.

The given pressure reduction value lies for example between 0 and 100 Pascals.

In this way, the control means 80 constitute means for triggering the ventilation 36 and the extraction means 74.

The control means 80 make it possible to obtain a constant air flow rate, as a function of the given pressure reduction value, independently of the state of fouling of the filtration means 26a, 28a, 26b, 28b.

The oven 10 operates according to a mode called the production mode, in which the heating means 64 are activated, or according to a mode called an out of production mode, in which the heating means 64 are deactivated.

The production mode corresponds to normal operation of preform heating, and the out of production mode corresponds to any other operating state of the oven 10, for example a waiting mode of the oven 10 or maintenance mode.

The ventilation modules 36 and the extraction means 74 are driven in rotation permanently whatever the mode in which the oven 10 operates, by virtue of which the oven 10 is permanently traversed by the to cooling air stream A.

In this way, only filtered air flows through the heating zone 16b, preventing in this way deposition of contaminating particles on the preforms or internal components of the oven 10.

In addition, the ventilation modules 36 are controlled by the associated control means 29, so that the air flow that is obtained by means of the ventilation modules 36 is less in the out of production mode than in the production mode of the oven 10.

Similarly, the given pressure reduction value varies as a function of the mode in which the oven operates, the given pressure reduction value being less when the oven 10 operates in the out of production mode.

More particularly, when the oven 10 operates in its out of production mode, the given pressure reduction value is determined so that the flow rate of the air stream extracted by the extraction means 74 is sufficient to extract surplus heat from the oven 10.

Similarly, when the oven 10 operates in its out of production mode, the first given pressure reduction value is determined so that the flow rate of the air stream extracted by the extraction means 74 is sufficient to prevent any contaminating particles from being deposited on the preforms or on an internal component of the oven 10, notably contaminating particles that are drawn in through the secondary air inlet ports 76.

According to another feature, the air inlet zone 16a has means 84a, 86a, for detecting fouling of the filtration means 26a, 28a.

The means 84a, 86a for detecting fouling have a second means 84a for measuring pressure reduction that is similar to the first means 82, previously described.

The second measuring means 84a, shown schematically in FIG. 2, measure the pressure difference between the outside of the oven 10 and a point that is situated between the pre-filter 26a and the filter 28a of the first air inlet port 22a.

In this way, the second measuring means 84a are capable of measuring the state of fouling or blocking of the pre-filter 26a by comparing the measured pressure reduction with a predetermined reference value.

Similarly, the means 84a, 86a for detecting fouling have a third measuring means 86a that measures the pressure difference between a point that is situated between the pre-filter 26a and the filter 28a and a point that is situated directly downstream of the filter 28a of the first inlet port 22a.

In this way, the third measuring means 86a are capable of measuring the state of fouling or blocking of the filter 28a by comparing the measured pressure reduction with a predetermined reference value.

By symmetry, the air inlet zone 16a has supplementary means (not shown) for detecting fouling of the filtration means 26b, 28b of the second inlet 22b.

When the filtration means 26a, 28a, 26b, 28b are fouled, they are either cleaned and sterilized, for example by means of steam, or are replaced, completely or in part, the replaced ones being then discarded and the others being cleaned.

According to an embodiment (not shown) the oven 10 has a first means for measuring the air flow that is arranged in the extraction duct 68, and a second means of measuring the air flow that is arranged in the plenum 18.

According to this variant, the first and second means for measuring the air flow each cooperate with the second means 80 for controlling the extraction means 74, so that the air stream that is extracted through the extraction duct 68 is greater than the air flow obtained by the ventilation modules 36.

Finally, with the aim of guaranteeing a high degree of hygiene and cleanliness of the preforms, the oven 10 has means for sterilization or for maintaining asepsis (not shown) that are capable of emitting ultraviolet radiation, so as to irradiate the internal components of the oven that are liable to be in contact with the preform, for example the supporting means or turntables that cooperate with the inner wall of the neck of the preforms.

Advantageously, the preforms are sterilized by means of a sterilizing agent, such as hydrogen peroxide, deposited by condensation inside the preform, this agent evaporating when it is subjected to the heating means of the oven 10, and then aspirated by the hood 66.

According to another alternative embodiment, the plenum 18 has a cylindrical shape with a vertical axis of which the cylindrical wall constitutes a peripheral air inlet port.

According to another embodiment, each ventilation module 36 is connected directly to the manifold 32 of the plenum, so that the associated casing 38 does not have an inlet collar 40, so as to reduce still further the pressure loss between the plenum 18 and the ventilation modules 36.

Similarly, according to another variant, each ventilation module 36 is directly connected to the plenum 18 without an intermediate manifold 32.

In a non-limiting manner, the invention also relates to an oven 10 that does not include extraction means 74 and/or the ventilation module 36 for blowing air onto the preforms, the oven 10 being then for example traversed upstream to downstream by a cooling air stream that flows vertically towards the extraction duct 68 by convection.

Similarly, the cooling air stream A through the oven 10 may be initiated by any blowing or aspirating means, whatever its arrangement in the oven 10 or in the vicinity of the oven 10.

For example, the cooling air stream A may be initiated by blowing means that are arranged upstream of the plenum 18 and that enable air to be blown through the inlet ports 22a, 22b of the plenum 18.

Similarly, the invention is in no way limited to an oven with a parallelepiped shape overall, as described above.

The invention also applies to an oven in the form of an arc, or with a circular or annular form or any other form.

The invention has many advantages and notably enables the pressure loss to be reduced in the air circuit, from the outside of the oven 10 to the ventilation module 36.

In point of fact, the plenum 18 constitutes an air distribution chamber or an air reserve, in which the associated ventilation modules 36 draw in air with little or no pressure loss.

Similarly, the plenum 18 constitutes a common distribution chamber which makes it possible to be free of the constraint of connecting each ventilation module 36 to the outside of the oven 10 by means of an associated chimney duct.

In addition, the plenum 18 is formed so as to reduce the distance between the ventilation modules 36 and the air inlet, here the inlet ports 22a, 22b.

In point of fact, the plenum 18 extends vertically to below the ventilation modules 36 and closest to the ventilation modules 36, which makes it possible to dispense with all or part of the chimney ducts according to the state of the art, by virtue of which pressure losses are reduced.

The plenum 18 makes it possible to exploit to the full the useful volume of the air inlet zone 16a of the oven 10, by extending laterally as far as the walls of the oven 10 and substantially as far as the ventilation modules 36.

In this way, the plenum 18 offers an advantageous ratio of overall size to pressure loss.

The design of the plenum 18 makes it possible to equip it with large inlet ports and to increase the total filtration area of the filtration means, while limiting restrictions between the inlet ports and the ventilation modules 36.

Finally, the invention also relates to an oven that has a single ventilation module and an associated plenum of the type previously described.

The invention claimed is:

1. Oven (10) for the thermal conditioning of preforms made of thermoplastic, an oven (10) that is traversed upstream to downstream by an air stream (A) for cooling the preforms and that comprises successively, in the direction of flow of said air stream (A):
    an air inlet zone (16a) that comprises at least one air inlet port (22a) through which said air stream (A) flows from the outside of the oven (10) to the inside of the oven (10),
    a zone (16b) for heating the preforms, that comprises means (64) for heating the preforms and at least one ventilation module (36) that is able to guide the air stream (A) coming from the inlet zone (16a) to the preforms,
    an air extraction zone (16c) comprising at least one air extraction duct (68), the air extraction zone (16c) being traversed by the air stream (A) that flows from the heating zone (16b) to the outside of the oven (10),
    wherein the air inlet zone (16a) of the oven (10) comprises an air distribution chamber (18) which is common to at least two ventilation modules (36) and which is arranged between the air inlet port (22a) having associated filtration means (26a, 28a, 26b, 28b) and between the at least two ventilation modules (36), closest to the at least two ventilation module (36) which are connected to the said common distribution chamber (18), said common chamber constituting an air reserve from which the associated at least two ventilation modules (36) are able to draw some air.

2. Oven (10) according to claim 1, wherein each ventilation module (36) has a rotor (44) mounted so as to rotate, and so as to draw in air contained in the common distribution chamber (18) and to blow the air drawn in in this way to the preforms.

3. Oven (10) according to claim 1, wherein the distribution chamber (18) is in the form of a parallelepiped casing comprising at least:
    a first large open lateral face (20a) that includes a first air inlet port (22a),
    a second large open lateral face (20b) that is opposite and parallel to the first large face (20a) and that includes a second air inlet port (22b).

4. Oven (10) according to claim 3, wherein each of the filtration means (26a, 28a, 26b, 28b) comprises successively at least:
    one upstream pre-filter (26a, 26b) that is able to filter particles with a first given diameter, and
    one downstream filter (28a, 28b) that is able to filter particles with a diameter less than said first given diameter.

5. Oven (10) according to claim 4, wherein each upstream pre-filter (26a, 26b) is a gravimetric filter.

6. Oven (10) according to claim 4, wherein each inlet port (22a, 22b) has a shape flared out towards the outside of the oven (10), each upstream pre-filter (26a, 26b) being arranged in the largest section of the associated air inlet port (22a, 22b), upstream of the associated downstream filter (28a, 28b), so that the cross section of the passage of each upstream pre-filter (26a, 26b) is greater than the cross section of the passage of the associated downstream filter (28a, 28b).

7. Oven (10) according to claim 3, wherein the distribution chamber (18) has a large face (30) that extends orthogonally to said large lateral faces (20a, 20b), and on which an air manifold (32) is connected that selectively connects each ventilation module (36) to the distribution chamber (18).

8. Oven (10) according to claim 4, wherein the inlet zone (16a) has means (84a, 86a) for detecting fouling of said filtration means (26a, 28a), said detection means being able to measure:
- a first pressure difference between a point situated directly upstream of the pre-filter (26a) and a point situated directly downstream of the pre-filter (26a), of the first inlet port (22a), and
- a second pressure difference between a point situated directly upstream of the filter (28a) and a point situated directly downstream of the filter (28a) of the first inlet port (22a),
- and of comparing each pressure difference with a respective predetermined pressure value, by virtue of which it is possible to evaluate individually the respective degrees of fouling of the pre-filter (26a) and of the filter (28a).

9. Oven (10) according to claim 2, wherein the distribution chamber (18) is in the form of a parallelepiped casing comprising at least:
- a first large open lateral face (20a) that includes a first air inlet port (22a),
- a second large open lateral face (20b) that is opposite and parallel to the first large face (20a) and that includes a second air inlet port (22b).

10. Oven (10) according to claim 1, wherein each of the filtration means (26a, 28a, 26b, 28b) comprises successively at least:
- one upstream pre-filter (26a, 26b) that is able to filter particles with a first given diameter, and
- one downstream filter (28a, 28b) that is able to filter particles with a diameter less than said first given diameter.

11. Oven (10) according to claim 2, wherein each of the filtration means (26a, 28a, 26b, 28b) comprises successively at least:
- one upstream pre-filter (26a, 26b) that is able to filter particles with a first given diameter, and
- one downstream filter (28a, 28b) that is able to filter particles with a diameter less than said first given diameter.

12. Oven (10) according to claim 5, wherein each inlet port (22a, 22b) has a shape flared out towards the outside of the oven (10), each upstream pre-filter (26a, 26b) being arranged in the largest section of the associated air inlet port (22a, 22b), upstream of the associated downstream filter (28a, 28b), so that the cross section of the passage of each upstream pre-filter (26a, 26b) is greater than the cross section of the passage of the associated downstream filter (28a, 28b).

13. Oven (10) according to claim 1, wherein the inlet zone (16a) has means (84a, 86a) for detecting fouling of said filtration means (26a, 28a), said detection means being able to measure:
- a first pressure difference between a point situated directly upstream of the pre-filter (26a) and a point situated directly downstream of the pre-filter (26a), of the first inlet port (22a), and
- a second pressure difference between a point situated directly upstream of the filter (28a) and a point situated directly downstream of the filter (28a) of the first inlet port (22a),
- and of comparing each pressure difference with a respective predetermined pressure value, by virtue of which it is possible to evaluate individually the respective degrees of fouling of the pre-filter (26a) and of the filter (28a).

14. Oven (10) for the thermal conditioning of preforms made of thermoplastic, an oven (10) that is traversed upstream to downstream by an air stream (A) for cooling the preforms and that comprises successively, in the direction of flow of said air stream (A):
- an air inlet zone (16a) that comprises at least one air inlet port (22a) through which said air stream (A) flows from the outside of the oven (10) to the inside of the oven (10),
- a zone (16b) for heating the preforms, that comprises means (64) for heating the preforms and at least one ventilation module (36) that is able to guide the air stream (A) coming from the inlet zone (16a) to the preforms,
- an air extraction zone (16c) comprising at least one air extraction duct (68), the air extraction zone (16c) being traversed by the air stream (A) that flows from the heating zone (16b) to the outside of the oven (10),
wherein the air inlet zone (16a) comprises:
at least two ventilation modules (36), and
at least one air distribution chamber (18), called a plenum, which is interposed between the air inlet port (22a) and each of the ventilation modules (36), each ventilation module (36) being connected to the distribution chamber (18), and
wherein the distribution chamber (18) is in the form of a parallelepiped casing comprising at least:
a first large open lateral face (20a) that includes a first air inlet port (22a),
a second large open lateral face (20b) that is opposite and parallel to the first large face (20a) and that includes a second air inlet port (22b).

15. Oven (10) for the thermal conditioning of preforms made of thermoplastic, an oven (10) that is traversed upstream to downstream by an air stream (A) for cooling the preforms and that comprises successively, in the direction of flow of said air stream (A):
- an air inlet zone (16a) that comprises at least one air inlet port (22a) through which said air stream (A) flows from the outside of the oven (10) to the inside of the oven (10),
- a zone (16b) for heating the preforms, that comprises means (64) for heating the preforms and at least one ventilation module (36) that is able to guide the air stream (A) coming from the inlet zone (16a) to the preforms,
- an air extraction zone (16c) comprising at least one air extraction duct (68), the air extraction zone (16c) being traversed by the air stream (A) that flows from the heating zone (16b) to the outside of the oven (10),
wherein the air inlet zone (16a) comprises:
at least two ventilation modules (36), and
at least one air distribution chamber (18), called a plenum, which is interposed between the air inlet port (22a) and each of the ventilation modules (36), each ventilation module (36) being connected to the distribution chamber (18),
wherein each air inlet port (22a, 22b) has associated air filtration means (26a, 28a, 26b, 28b),
wherein each of the filtration means (26a, 28a, 26b, 28b) comprises successively at least:
one upstream pre-filter (26a, 26b) that is able to filter particles with a first given diameter, and
one downstream filter (28a, 28b) that is able to filter particles with a diameter less than said first given diameter, and wherein each inlet port (22a, 22b) has a shape flared out towards the outside of the oven (10), each downstream pre-filter (26a, 26b) being arranged in the largest section of the associated air inlet port (22a, 22b), upstream of the associated downstream filter (28a, 28b), so that the cross section of the passage of each upstream pre-filter (26a, 26b) is greater than the cross section of the passage of the associated downstream filter (28a, 28b).

* * * * *